US006954282B2

(12) United States Patent
Miyamoto et al.

(10) Patent No.: US 6,954,282 B2
(45) Date of Patent: Oct. 11, 2005

(54) METHOD AND APPARATUS FOR PROCESSING AN IMAGE, AND STORAGE MEDIUM

(75) Inventors: Noriaki Miyamoto, Yokohama (JP); Kazuhiro Watanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 250 days.

(21) Appl. No.: 09/515,057

(22) Filed: Feb. 28, 2000

(65) Prior Publication Data

US 2003/0197894 A1 Oct. 23, 2003

(51) Int. Cl.[7] .................................................. G06F 15/00
(52) U.S. Cl. ....................................... 358/1.18; 358/1.15
(58) Field of Search ......................... 358/1.1, 1.5, 1.12, 358/1.13, 1.14, 1.15, 1.16, 1.17, 1.18, 296

(56) References Cited

U.S. PATENT DOCUMENTS 5,828,461 A * 10/1998 Kubo et al. ................. 358/296
6,295,136 B1 * 9/2001 Ono et al. ................. 358/1.15
6,301,013 B1 * 10/2001 Momose et al. ........... 358/1.15
6,453,078 B2 * 9/2002 Bubie et al. ................ 382/305

FOREIGN PATENT DOCUMENTS

| | | | |
|---|---|---|---|
| JP | 09-198392 | 7/1997 | G06F/17/30 |
| JP | 10-40042 | 2/1998 | G06F/3/12 |
| JP | 10-293838 | 11/1998 | G06T/1/00 |
| JP | 10-293857 | 11/1998 | G06T/11/60 |

* cited by examiner

*Primary Examiner*—Mark Wallerson
(74) *Attorney, Agent, or Firm*—Fitzpatrick, Cella, Harper & Scinto

(57) ABSTRACT

An image processing method, an image processing apparatus, and a storage medium are disclosed which allow the same layout and editing process to be specified for different images in an easy fashion. An image processing method, an image processing apparatus, and a storage medium are also disclosed which allow a selection condition to be input in an easy fashion thereby selecting desired image information from plural pieces of image information. A layout name is assigned to a set of editing processes performed on an image or to an image selection condition and registered together. Information can be used again by specifying a particular layout name.

31 Claims, 9 Drawing Sheets

METHOD AND APPARATUS FOR PROCESSING AN IMAGE, AND STORAGE MEDIUM

BACKGROUND OF THE INVENTION

1. Field of the Invention

The present invention relates to a method, apparatus, and storage medium for processing an image, capable of performing a desired editing process on an image.

The present invention also relates to a method, apparatus, and storage medium which allow an editing process to be designated in an easy fashion.

The present invention also relates to a method, apparatus, and storage medium which allow desired image information to be selected from a plurality of image information and laid out.

2. Description of the Related Art

In conventional techniques, an editing process performed on a selected image is recorded together with the image information, and it is impossible to record the editing process separately from the image information.

When an image is selected from a plurality of images, a selection condition has to be designated each time an image is selected.

In the conventional techniques, when an image such as that photographed by a user is pasted in a particular part of a template prepared in advance such as a Christmas card or a New Year card, and an editing process such as enlargement, reduction, movement, rotation is performed upon the image, data representing the editing process is stored in such a manner that the data is linked with that image. Therefore, when another different image is pasted in the same template, it is required to again designate the editing process for the image.

That is, when the same editing process is performed on a plurality of images, it is required to designate the editing process as many times as there are images. This is very troublesome for a user.

Furthermore, in the conventional techniques, when a plurality of images are selected under the same selection condition, it is required to input the same selection condition for each image. This is also troublesome for a user.

SUMMARY OF THE INVENTION

According to an aspect of the present invention, to solve the above problems, there is provided a method of processing an image, comprising the steps of: specifying a plurality of editing processes to be performed on an image; registering said plurality of specified editing processes as one set of editing processes; and identifying a set of editing processes thereby determining a plurality of editing processes to be performed on an image.

Preferably, in this method according to the present invention, an identifier indicating the one set of editing processes is registered, and the method further comprises the steps of displaying a plurality of registered identifiers in the form of a list; and calling a set of editing processes corresponding to an identifier selected from the list of the plurality of registered identifiers.

Preferably, the plurality of specified editing processes are registered as layout information.

The plurality of editing processes may include image rotation.

The plurality of editing processes may include image enlargement.

The plurality of editing processes may include image reduction.

The plurality of editing processes may include image brightness adjustment.

The plurality of editing processes may include image contrast adjustment.

The plurality of editing processes may include designation of an image aspect ratio.

The plurality of identified editing processes may be performed upon newly input image information.

According to another aspect of the present invention, there is provided a method of processing an image, comprising the steps of: identifying an editing process performed on an image; assigning an identifier to the identified editing process and registering the identifier assigned to the editing process; and calling the editing process indicated by a-specified identifier, and performing the editing process upon another image which is different from the previous image.

Preferably, in this method according to the present invention, when the editing process is registered, the image upon which the editing process has been performed is not registered.

The image may be an image input by means of scanning using a scanner.

The image may be an image photographed using a digital camera.

The image may be an image stored on a storage medium.

The image may be an image input by means of scanning using a film scanner.

According to another aspect of the present invention, there is provided a method of processing an image, comprising the steps of: designating a selection condition from a plurality of image information selection conditions which have been registered in advance; detecting image information which meets the designated selection condition from plural pieces of image information and calling the detected image information; and outputting the called image information.

In this method according to the present invention, said selection condition is preferably a condition based on the order of storing the plural pieces of information.

The selection condition may be magnetic information stored in such a manner that image information is linked to the corresponding image information.

The method may further include the steps of: displaying, in the form of a list, names representing the selection conditions together with names representing plural pieces of layout information which have been registered in advance; and performing, upon an image, a process corresponding to a name selected from the list of names.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENT

Figure 1:
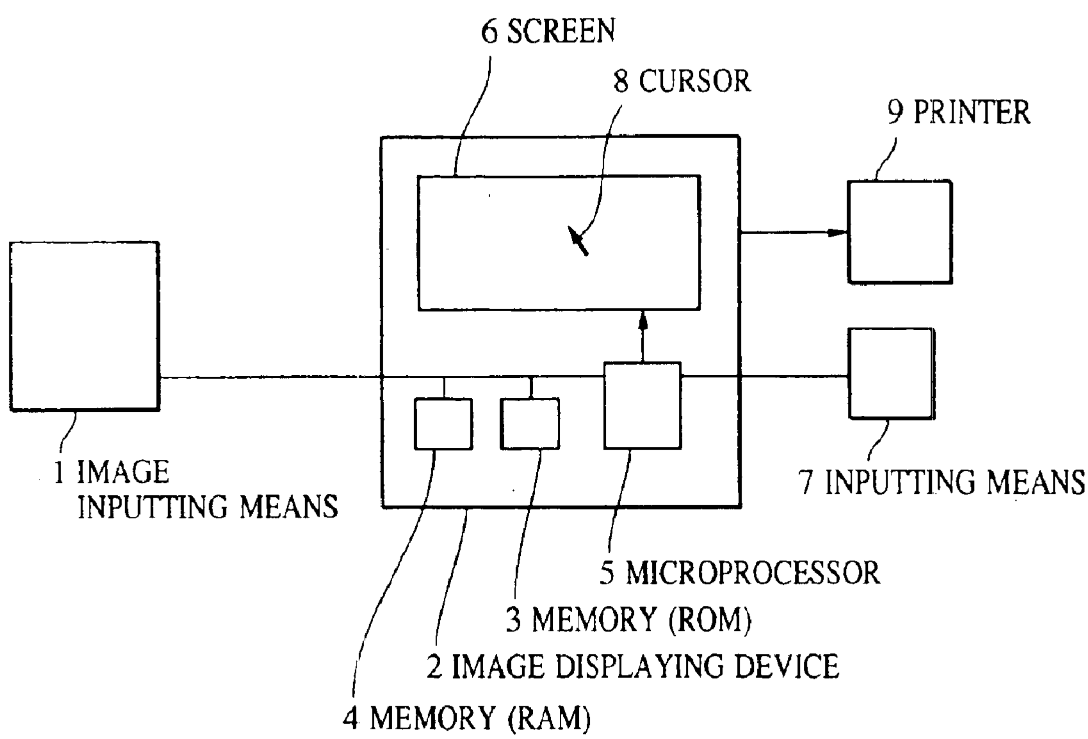
FIG. 1 is a block diagram illustrating the construction of an image processing apparatus according to the present invention.

FIG. 1 is a block diagram illustrating the construction of an image processing apparatus according to the present invention. In FIG. 1, an image inputting device 1 is, for example, a scanner and serves as image inputting means for optically scanning and inputting an image of a document. Instead of the scanner, a removable recording medium such as a CD-ROM or an MO capable of recording image data which can be input to the image processing apparatus may also be employed as the image inputting device 1. Alternatively, the image inputting device 1 may be a communication interface for downloading image data from a terminal connected via a communication line. Images in various forms may be input to the image processing device 1. For example, an image recorded on a recording medium such as paper may be optically scanned and input. An image formed on a film may be input using a film scanner serving as the image inputting device 1. An image in the form of a digital image taken via a digital camera or the like may also be input.

An image display device 2, including a memory (ROM) 3, a memory (RAM) 4, a microprocessor 5, and a display screen 6, serves as image display means for displaying image data input via the image inputting device 1. The memory 4 serves to store image data input via the image inputting device 1. The memory 4 also serves as a work memory for storing data produced during a process. The memory 4 is also used to store registered data according to the present invention. A control program for executing a process which will be described later with reference to a flow chart may be stored in either the memory 3 or the memory 4. In the case where the control program is installed from a removable storage medium (such as a CD-ROM, FD, and MO, not shown in FIG. 1) or downloaded from another terminal connected via a communication line, the control program is stored in the memory 4. The process according to the present invention is executed under the control of the microprocessor 5 in accordance with the control program stored in the memory 3 or 4. The display screen 6 is realized by a CRT or a liquid crystal display. The display screen 6 is used to display various screen images thereby allowing a user to edit and register image data and associated data. A cursor 8 is displayed on the display screen 6 so that a desired coordinate on the display screen 6 can be designated by moving the cursor to a desired point on the display screen 6.

As for the inputting means 7 for inputting various data, a keyboard or the like for inputting characters and functions or coordinate inputting means such as a mouse or a tablet may be employed. The printer 9 serves as outputting means for outputting data such as image data, graphic data, and strings produced on the display screen 6. Specific examples of the printer 9 include an LBP and an ink-jet printer. When an editing process such as movement, rotation, enlargement, or reduction is performed upon an image which is displayed on the display screen 6 after being input via the image inputting device 1, a specific editing command is input via the inputting means 7, and an editing process corresponding to the editing command is executed by the microprocessor 5. The resultant edited image is then output via the printer 9.

The present invention is not limited to a system which includes all parts shown in FIG. 1, but the invention may also be applied to a system in which some parts such as the image inputting device 1 or the printer 9 are connected to other parts such as the image display device 2 or the inputting means 7 via a network.

Figure 4:
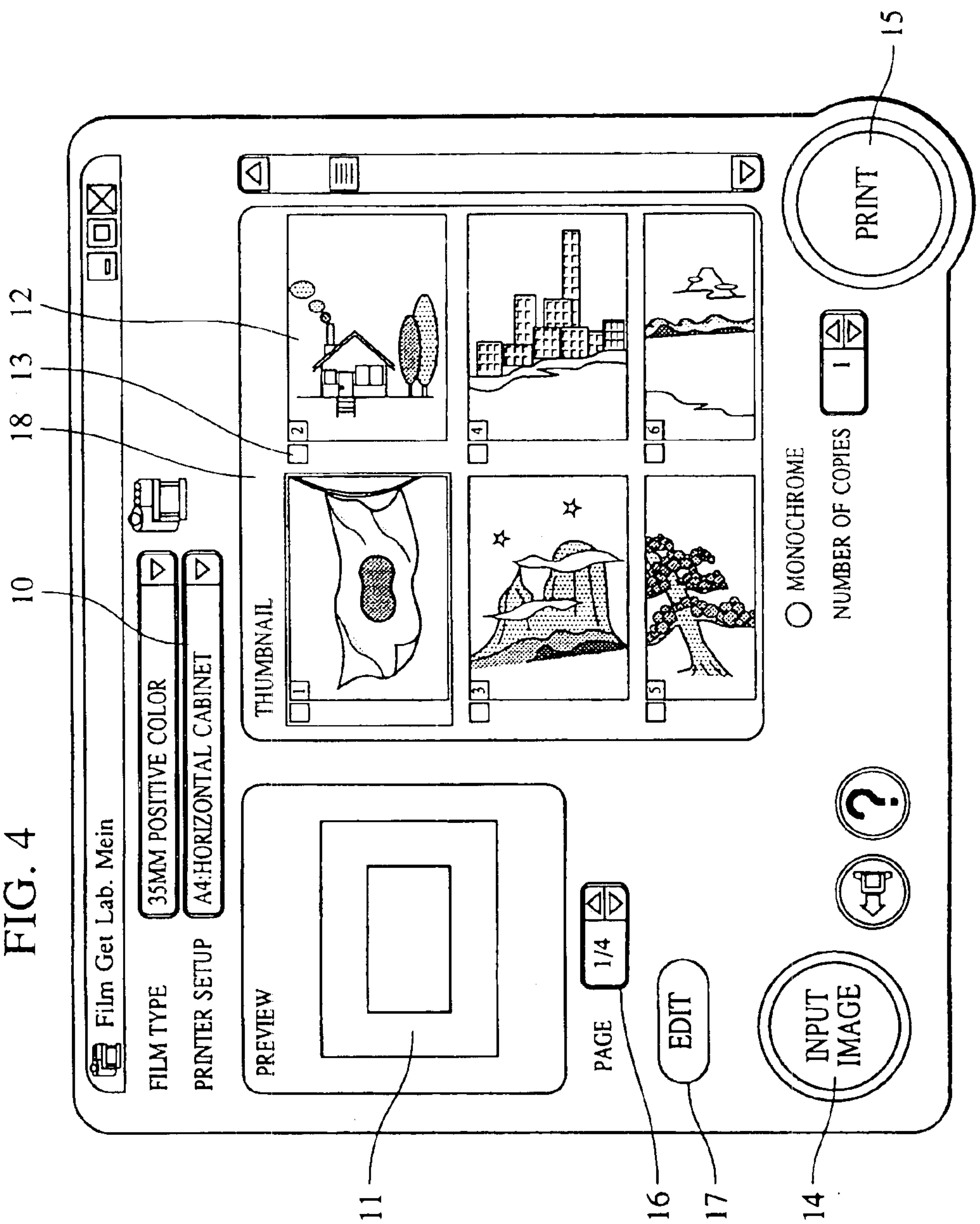
FIG. 4 illustrates an example of a main screen image.

FIG. 4 illustrates a main screen image used to designate a process according to the present invention, wherein the main screen image is displayed in the form of a window on the display screen 6. Images input via the image inputting means 1 are displayed in this main screen image, and a desired image can be selected from the images displayed. The operation of inputting an image via the image inputting means 1 is started when an INPUT IMAGE button 14 is clicked. When the INPUT IMAGE button 14 is clicked once, the image inputting means 1 performs an image inputting operation once. In the case where there are a plurality of images to be input, the plurality of images can be input only by clicking the INPUT IMAGE button 14 once. The input image(s) is (are) displayed on the main screen. It is possible to determine which one of a plurality of buttons displayed on the display screen is clicked, by comparing the coordinates of a point which is designated via the inputting means 7 (by clicking a mouse button or by tapping a tablet with a pen) with coordinate information (stored in the memory 4) representing the areas of the respective buttons. This technique is also used to determine which one of buttons is clicked in other screen images which will be described later. Instead of clicking a button displayed on the screen, a command corresponding to the button may be input via the keyboard or the like.

On the main screen, if a PRINT button 15 is clicked, a currently selected image is printed via the printer 9. Herein, the selected image refers to an image selected from a plurality of images which are displayed in the form of thumbnail images (reduced-size images) after being input via the image inputting means 1 wherein selection may be performed by clicking a desired thumbnail image 12 itself or a check box 13 of the desired thumbnail image 12, using the inputting means. If a particular thumbnail image 12 is selected, a selection mark is displayed in the check box 13 to indicate that the image is selected. In the example shown in FIG. 6, a mark {✓} is displayed in check boxes 13 of selected images so that the selected images can be discriminated from non-selected images. In the image selection operation, the selected state and the non-selected state are alternately switched each time a thumbnail image 12 or a check box 13 is clicked, and the status of the image is stored in the memory 4. The selected image is displayed in a print image preview window 11. Herein, only an image to be printed on one sheet of paper is displayed in the pint image preview window. If a preview page designation button 16 is clicked, the preview image is switched to a previous or following image. Numeric values are displayed at a side of the preview page designation button 16 to indicate the total number of pages on which selected images are to be printed and indicate which page is currently displayed in the print image preview window 11. In the specific example shown in FIG. 4, the numeric values indicate that there are four pages in total and the first page is currently displayed in the print image preview window 11. Note that no image is selected and thus no image is displayed in the print image preview window 11 in the specific example shown in FIG. 4.

Figure 5:
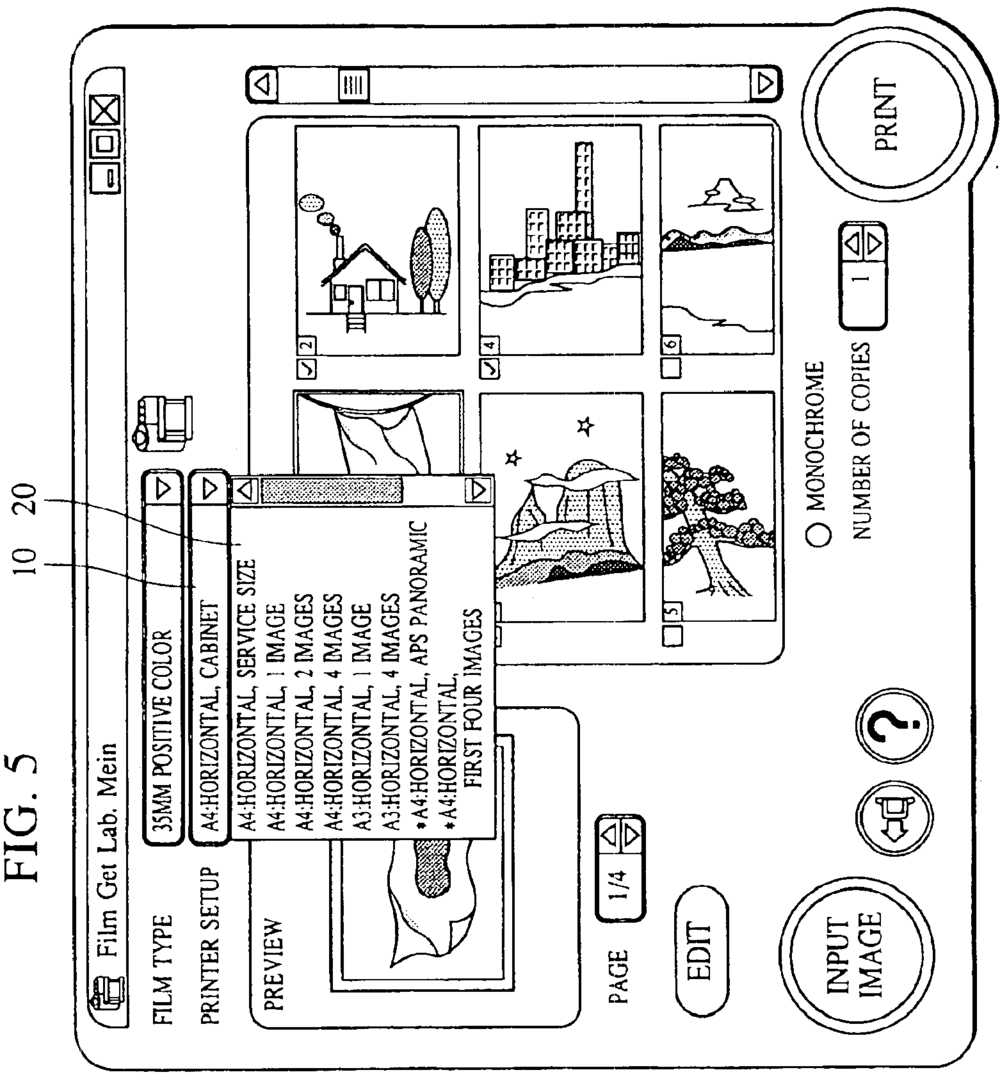
FIG. 5 illustrates an example of a main screen image used to perform a printer setting.

In a printing condition setting box 10, a layout selected from a plurality of layouts registered in advance in the memory 4 is displayed. If an inverted triangle button in the printing condition setting box 10 is clicked via the inputting means 7, names of layouts which can be selected in the printing condition setting box 10 are read from the memory 4 and displayed in the form of a pull-down menu. An example of the pull-down menu is shown in FIG. 5. In this specific example, the names of nine selectable layouts are displayed. If a desired layout name is selected from the pull-down menu, layout information corresponding to the selected layout name is read from the memory 4, and setting of the selected image is performed in accordance with the layout information. The print image preview window 11 displays images to be laid on one sheet of paper. However, when no image is selected yet, the print image preview window 11 displays, as shown in FIG. 4, only an image layout frame corresponding to the layout name displayed in the printing condition setting box 10, in accordance with layout information. In the specific example shown in FIG. 6, the selected layout includes one image to be printed on one sheet. Each time a layout is selected in the printing condition setting box 10, the frame displayed in the print image preview window 11 is updated.

When an image is selected, the selected image is displayed in the print image preview window 11 in accordance with a layout corresponding to a layout name displayed in the printing condition setting box 10. That is, the selected image is displayed within the frame which is displayed when no image is selected.

Figure 6:
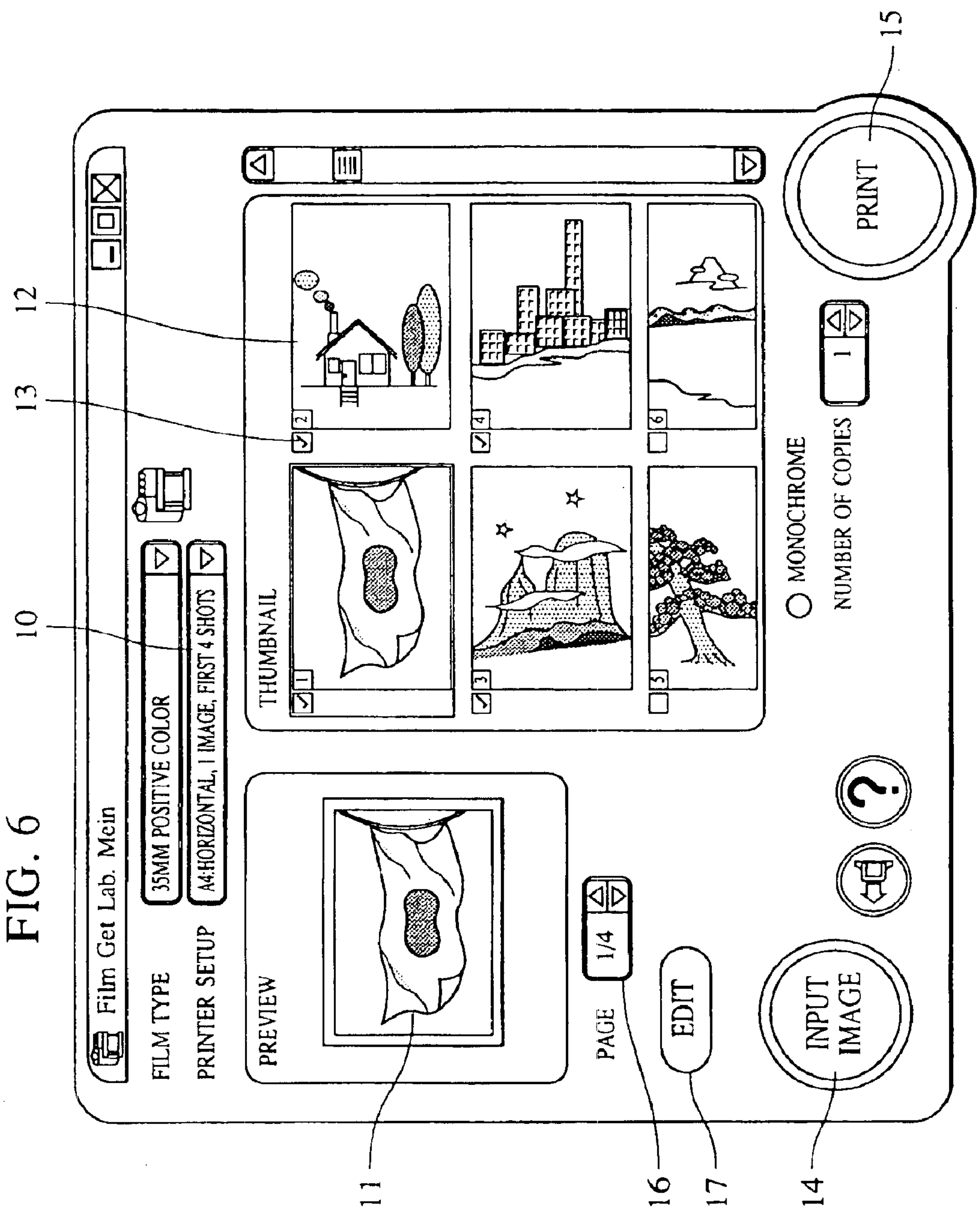
FIG. 6 illustrates an example of a main screen image in which an image selection condition is designated.

An image may also be selected as follows. A mouse button is pressed when a desired thumbnail image is pointed to by a cursor. The cursor is then moved into the print image preview window 11 while maintaining the mouse button in the pressed state. After that, if the mouse button is released, the image, which was pointed to by the cursor when the mouse button was pressed, is displayed in the print image preview window 11. FIG. 6 illustrates an example of the print image preview window 11 in which an image selected by the above-described image selection operation is displayed.

Instead of selecting an image from those displayed in the form of thumbnail images, an image may also be selected by designating, via the printing condition setting box 10, a layout name including an image selection condition. In the example in FIG. 6, a layout including an image selection condition "first four shots" is selected in the printing condition setting box 10, and, as a result, first four shots of images are selected from the thumbnail images 12 wherein the selection mark is displayed in the check box of each thumbnail image selected.

In a specific case where an image is selected in the printing condition setting box 10 by selecting a layout including magnetic information "APS panorama" as the image selection condition from the pull-down menu shown in FIG. 5, magnetic information is examined for all thumbnail images displayed, and images which meet the designated selection condition (images photographed in the form of APS panorama, in this example) are selected. Magnetic information is stored together with image data into the memory 4 when an image is input via the image inputting means 1.

Figure 2:
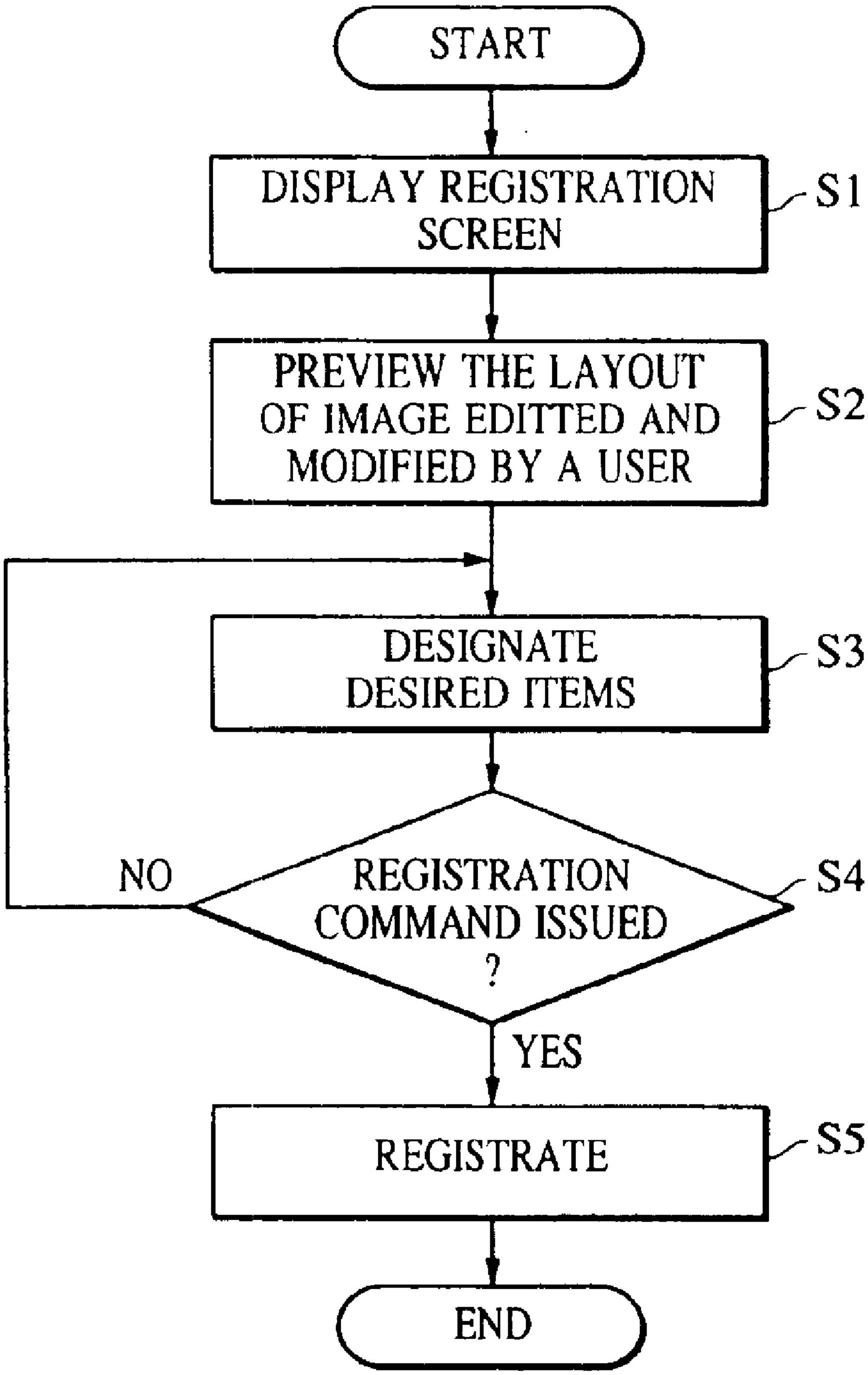
FIG. 2 is a flow chart illustrating a layout registration process.

A description is now given as to the process of registering a desired layout so that the registered layout will be displayed in the pull-down menu of the printing condition setting window 10 such as that shown in FIG. 5. In this layout registration process, a user inputs information via the inputting means 7, and the input information is stored in the memory 4. FIG. 2 is a flow chart illustrating the layout registration process.

A layout to be registered is designated as follows. First, the edit screen (FIG. 7) for editing an image is displayed by clicking the EDIT button 17 on the main screen. In the next step of the layout registration, a paper type is selected, and then an image frame is laid and edited on the edit screen shown in FIG. 7. Then on the registration screen shown in FIG. 8, an image selection condition and a layout name are set and registered.

Figure 7:
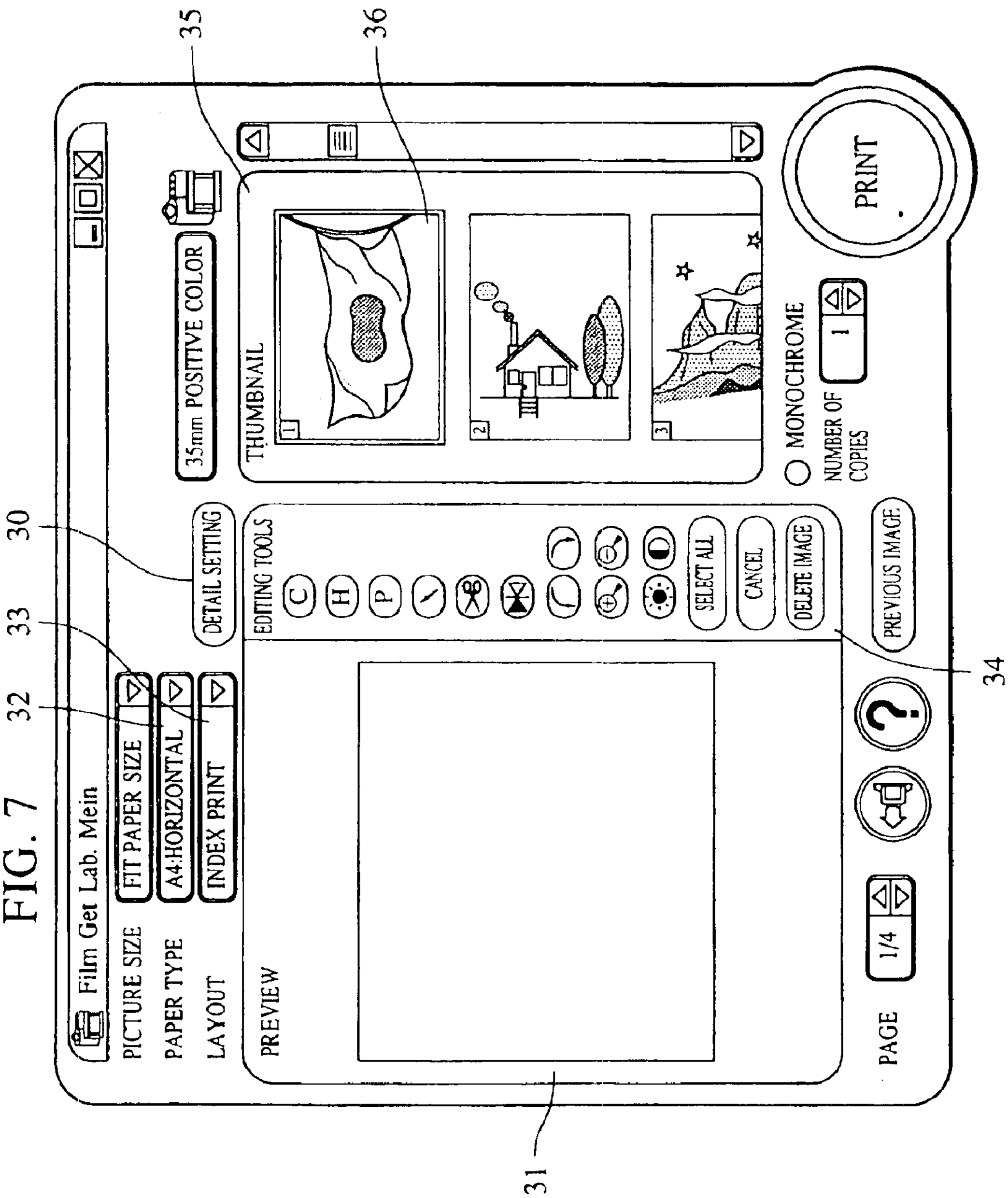
FIG. 7 illustrates an example of an editing screen image.
Figure 8:
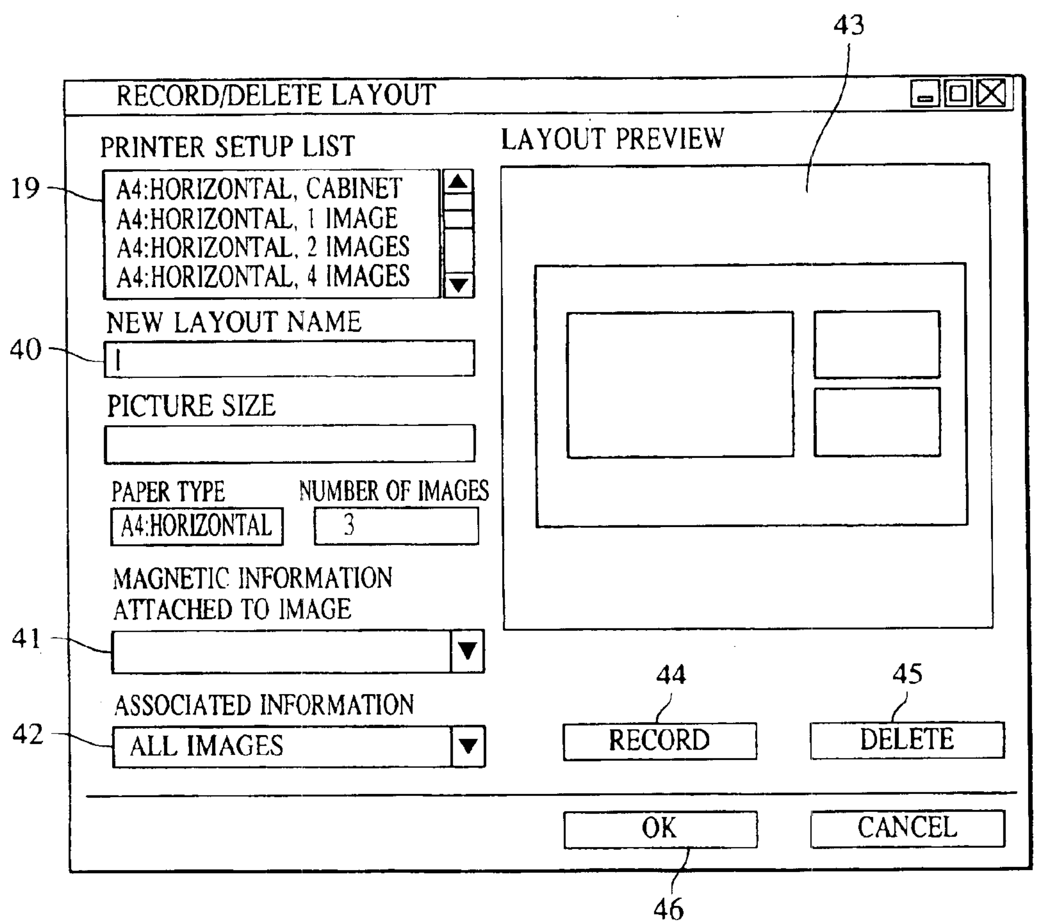
FIG. 8 illustrates an example of a registration screen image.

In FIG. 7, a desired paper size (A4, B5, etc.) and a paper direction (vertical or horizontal direction) are designated using a paper type selection box 32. In the paper type selection box 32, information in terms of combinations of available paper sizes and paper directions is read from the memory 4 and displayed in the form of a pull-down menu so that a user can select a paper size and a paper direction from the pull-down menu using the inputting means 7. If a paper type is selected in the paper type selection box 32, a frame representing the selected paper size and direction is displayed in a print preview window 31. Then an image is laid and edited within the paper frame displayed in the print preview window 31.

More specifically, an image frame is laid in the paper frame and edited. The image frame may be laid by defining the image frame within the paper frame using the inputting means 7 such as a mouse. Still alternatively, an image frame may be laid using a layout which has already been registered. In this case, if a desired layout is selected using a layout selection box 33, then an image frame corresponding to the selected layout is displayed in the print preview window 31. The layout names displayed in the layout selection box 33 are the same as those which are stored in the memory 4 and displayed in the pull-down menu shown in FIG. 5. However, what can be here on the edit screen is to lay an image frame and edit it, but an associated image selection condition is set on another screen which will be described later. Therefore, layout names which include only image selection conditions may not be displayed in the layout selection box.

If a layout name is selected in the layout selection box 33, layout information corresponding to the selected layout name is read from the memory 4, and an image frame representing the selected layout is displayed in the print preview window 31. Thus, a user can now start editing the frame displayed.

Edition of the frame may be performed by designating one of various buttons displayed in the editing command window 34 via the inputting means 7. If an editing command button is selected, an editing process corresponding to the selected button is performed on the frame displayed in the print preview window 31. Information representing the type of the editing process performed is stored in the memory 4. In the case where the layout includes a plurality of images to be printed on one sheet of paper, images to be edited and editing processes performed upon the images may be designated by first selecting images to be edited and then designating the types of editing processes. More specifically, when the type of an editing process is input, an image which is in a selected state is detected, and data indicating the correspondence between the image in the selected state and the type of the editing process is stored in the memory 4. The types of available editing processes may include generation of an image frame, designation of the aspect ratio of an image, trimming of an image in a designated area, 90 {degree} rotation of an image in a clockwise direction, 90 {degree} rotation of an image in a counterclockwise direction, enlargement of an image by a factor selected from predetermined values represented in percent, reduction of an image by a factor selected from predetermined values represented in percent, mirror-image inversion; brightness adjustment, and contrast adjustment. The editing command window 34 may also include auxiliary editing commands such as an all selection command for selecting all images displayed in the print preview window 31, a cancel command for canceling an issued editing command, and an image deleting command for deleting a designated image in the print preview window 31.S The print preview window 31 may be designed such that an edit process may be performed for an image frame, or such that an image, selected by designating a thumbnail image displayed in the thumbnail image window 35, may be displayed in the print preview window 31 thereby allowing a user to edit the image which is displayed in a more realistic fashion. Herein, the thumbnail images 36 displayed in the thumbnail image window 35 are the same as those which were displayed on the main screen when the EDIT button 17 was clicked.

Figure 9:
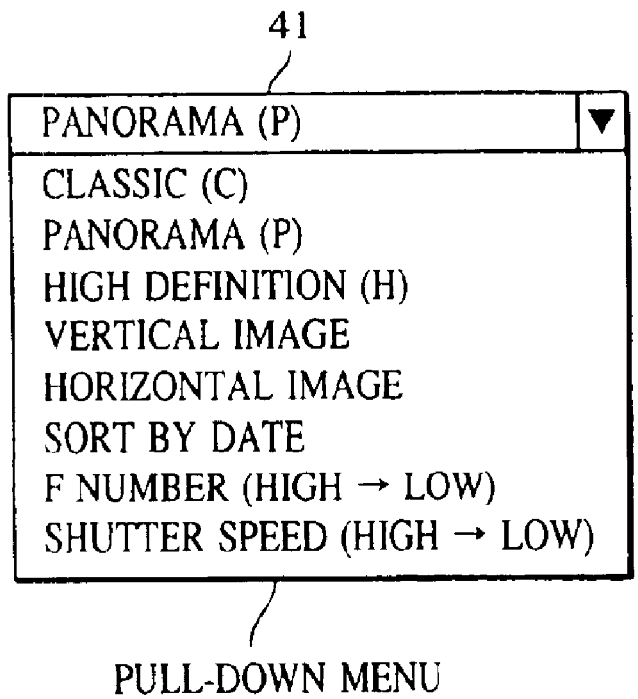
FIG. 9 illustrates an example of a magnetic information list.

If a detail setting button 30 is clicked after completion of the editing process, the registration screen (FIG. 8) is displayed on the display screen 6 so that a user can register the layout (S1). The layout which has been edited and processed on the edit screen by the user is displayed in a layout preview window 43 in the layout registration screen so that the user can confirm that the correct layout is going to be registered (S2). At this stage, the registration screen may accept a command input via a printer setup list 19, a new layout name box 40, a magnetic information box 41, or an image-associated information box 42. An example of the magnetic information list displayed, in the form of a pull-down menu, in the magnetic information box 41 is shown in FIG. 9. Information associated with these commands in the list is stored in advance in the memory 4 so that, when an inverted triangular button of the magnetic information box 41 is clicked, information is read from the memory 4 and the pull-down menu is displayed. If a magnetic information command is selected from the list via the inputting means 7, the selected command is displayed in the magnetic information box 41.

Figure 10:
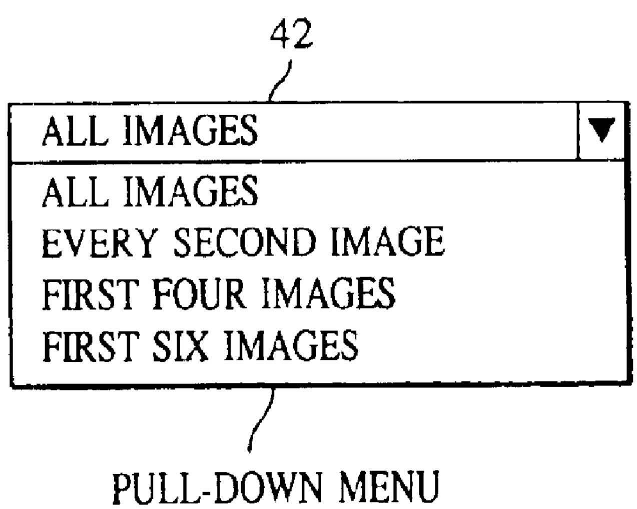
FIG. 10 illustrates an example of an image-associated information list.

An example of an image-associated information list displayed in the form of a pull-down menu in the image-associated information box 42 is shown in FIG. 10. Information associated with these commands in the list is stored in advance in the memory 4 so that, when an inverted triangular button of the image-associated information box 42 is clicked, information is read from the memory 4 and the pull-down menu is displayed. If an image-associated information command is selected from the list via the inputting means 7, the selected command is displayed in the image-associated information box 42. Herein, the image-associated information refers to a selection condition specifying a condition under which an image is selected. For example, when "all images" is selected as the image-associated information, all images which have been input via the image inputting means 1 and which are currently displayed in the form of thumbnail images are selected, laid, and output. If "every second image" is selected as the image-associated information, every second image, that is, the first image, the third image, the fifth image and so on are selected from the images, which have been input via the image inputting means 1 and which are now displayed in the form of thumbnail images. The selected images are then laid and output.

If a RECORD button 44 is clicked (S4), the layout indicating the location of an image displayed in the layout preview window 43 and also indicating the associated edit process, the printing condition setting information displayed in the print condition setting list box 19, the picture size information displayed in the picture size box, the paper selection information displayed in the paper type selection box, the number-of-images information displayed in the number-of-images box, the magnetic information displayed in the magnetic information box 41, and the image-associated information displayed in the image-associated information box 42 are stored in the memory 4 together with the layout name displayed in the new layout name box 40 in such a manner that the above layout information is linked to the layout name (S5). Even in the case where layout information to be registered in the memory 4 is selected in the preview window displaying an image, only the type of an edit process and associated parameters (such as an enlargement ratio or a reduction ratio) are registered without registering the image itself. The layout name serves as an identifier which is used when the above-described information is called. The layout name may be defined by a string of characters or numerals input via a keyboard or a soft key. If the DELETE button 45 is clicked, information stored in the memory 4 via the registration screen (FIG. 8) in respective registration operations is entirely deleted, and the process returns to the edit screen (FIG. 7). When the CANCEL button is clicked, information which has been newly input via the registration screen (FIG. 8) and stored in the memory 4 is deleted, and the process returns to the edit screen (FIG. 7).

In the case where an existing layout is edited instead of registering a new layout, layout information corresponding to a designated layout name is called onto the edit screen (FIG. 7) and edited on the edit screen and the registration screen. If the OK button 46 is clicked after completion of the editing process, the layout information is updated to new layout information. In this case, the layout name of the layout called on the edit screen is displayed in the new layout name box 40. If, in this state, the OK button 46 is clicked, items of layout information stored in the memory 4 are updated to those which have been newly input or changed.

Figure 3:
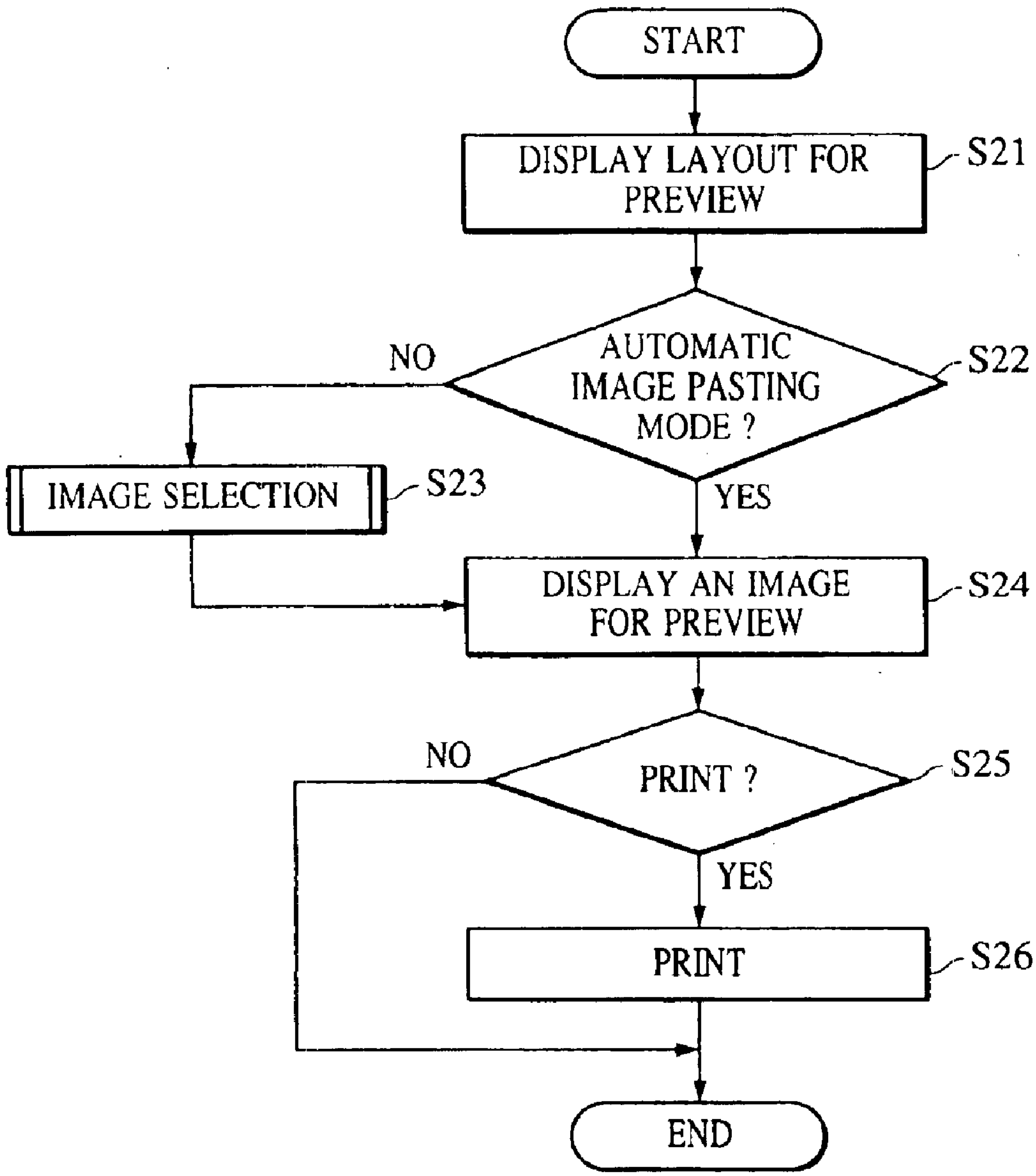
FIG. 3 is a flow chart illustrating a layout calling process.

The process of calling an existing layout is described below with reference to the flow chart shown in FIG. 3. If a layout name is selected in the printing condition setting box 10 on the main screen (FIG. 6), the layout information corresponding to the layout name is read from the memory 4, and the frame representing the layout is displayed in the print preview window 11 (S21) so that a user can confirm that the correct layout has been called. In the case where the selected layout includes an image selection condition, an image is selected in accordance with the image selection condition. Conversely, if the selected layout does not include an image selection condition, an operation of selecting an image may be accepted (S22). If an image is selected by a user in step S23, the process goes to step S24. In step S24, the image selected in step S22 or S23 is displayed in the print preview window 11. Herein, when the selected image is displayed in the print preview window 11, the image is displayed in accordance with the layout which is read from the memory 4 in accordance with the selected layout name. If the PRINT button 15 is clicked (S25), print data is produced in accordance with the layout displayed in the print preview window 11 and printed via the printer 9.

As can be understood from the above description, the present embodiment has the following advantages. In an image printing application, when a user can edit an image in terms of the image frame layout, the size of the image, the inclination angle of the image, the location, the cut-out area, the mirror-image formation, and so on and register them in the form of a template. After that, the same layout can be called and another different image can be attached to the layout. This allows a user to perform a set of editing processes upon an image and to attach the edited image to a page, simply by selecting an image. Furthermore, it is not required to repeat an operation to specify the same edit process, and thus it becomes possible to perform the correct edit process without resulting in a miss operation.

Furthermore, a plurality of selection conditions based on magnetic information representing the data, time, exposure condition, focal length, the aspect ratio, etc., used for example in an APS film, or based on the order of recording image information are registered so that an image (images) can be easily selected simply by specifying a desired selection condition from the plurality of selection conditions.

What is claimed is:

1. An image processing method, comprising the steps of:

deciding layout information for an output image based on at least one frame being positioned at a user-desired position on an output image preview window according to a user designation;

registering an editing set to an editing menu, wherein the editing set includes the decided layout information and a plurality of editing processes designated by the user;

identifying an editing set selected from the editing menu;

inputting a plurality of images by image inputting means;

displaying the plurality of images input by the image inputting means in the form of reduced-size images;

selecting at least one image from the plurality of displayed images; and outputting the output image generated by performing the plurality of editing processes, included in the editing set identified in said identifying step, on the at least one image selected in said selecting step and by arranging the selected image at the user-desired position based on the layout information, included in the editing set identified in said identifying step, wherein the editing processes and the layout information thereby correspond to the editing set identified in said identifying step, and wherein each frame indicates information of the user-desired position to arrange each selected image on the output image.

2. An image processing method according to claim 1, further comprising a step of displaying the editing menu that includes a plurality of identifiers each indicating one of the registered editing sets, wherein said identifying step includes identifying the selected editing set by identifying an identifier selected from the editing menu.

3. An image processing method according to claim 1, wherein the editing set includes image rotation.

4. An image processing method according to claim 1, wherein the editing set includes image enlargement.

5. An image processing method according to claim 1, wherein the editing set includes image reduction.

6. An image processing method according to claim 1, wherein the editing set includes image brightness adjustment.

7. An image processing method according to claim 1, wherein the editing set includes image contrast adjustment.

8. An image processing method according to claim 1, wherein the editing set includes designation of an image aspect ratio.

9. An image processing method according to claim 1, wherein the editing set registered in said registering step is the plurality of editing processes designated by the user on the output image preview window.

10. An image processing method according to claim 1, wherein the image inputting means is at least one of a scanner, a digital camera, a storage medium, and a film scanner.

11. An image processing method according to claim 1, wherein the editing set includes an image selection condition, and wherein said selecting step includes selecting at least one image from the plurality of displayed images based on the image selection condition of the editing set identified in said identifying step.

12. An image processing method according to claim 11, wherein the image selection condition is a condition based on the order of the plurality of images displayed in said display step.

13. An image processing method according to claim 11, wherein the image selection condition is a condition based on magnetic information of the image.

14. An image processing apparatus comprising:

decision means for deciding layout information for an output image based on at least one frame being positioned at a user-desired position on an output image preview window according to a user designation;

registration means for registering an editing set to an editing menu, wherein the editing set includes the decided layout information and a plurality of editing processes designated by a user;

identification means for identifying an editing set selected from the editing menu;

image inputting means for inputting a plurality of images display means for displaying the plurality of images input by said image inputting means in the form of reduced-size images;

selection means for selecting at least one image from the plurality of displayed images; and output means for outputting the output image generated by performing the plurality of editing processes, included in the editing set identified by said identification means, on the at least one image selected by said selection means and by arranging the selected image at the user-desired position based on the layout information, included in the editing set identified by said identification means, wherein the editing processes and the layout information thereby correspond to the editing set identified by said identification means, and wherein each frame indicates information of the user-desired position to arrange each selected image of the output image.

15. An image processing apparatus according to claim 14, further comprising menu display means for displaying the editing menu that includes a plurality of identifiers each indicating one of the editing sets, registered by said registration means, and wherein said identification means identifies the selected editing set by identifying an identifier selected from the editing menu.

16. An image processing apparatus according to claim 14, wherein the editing set includes image rotation.

17. An image processing apparatus according to claim 14, wherein the editing set includes image enlargement.

18. An image processing apparatus according to claim 14, wherein the editing set includes image reduction.

19. An image processing apparatus according to claim 14, wherein the editing set includes image brightness adjustment.

20. An image processing apparatus according to claim 14, wherein the editing set includes image contrast adjustment.

21. An image processing apparatus according to claim 14, wherein the editing set includes designation of an image aspect ratio.

22. An image processing apparatus according to claim 14, wherein the editing set registered in said registration means is the plurality of editing processes designated by the user on the output image preview window.

23. An image processing apparatus according to claim 14, wherein said image inputting means is at least one of a scanner, a digital camera, a storage medium, and a film scanner.

24. An image processing apparatus according to claim 14, wherein the editing set includes an image selection condition, and wherein said selection means selects at least one image from the plurality of displayed imaged based on the image selection condition of the editing set identified by said identification means.

25. An image processing apparatus according to claim 24, wherein the image selection condition is a condition based on the order of the plurality of images displayed by said display means.

26. An image processing apparatus according to claim 24, wherein the image selection condition is a condition based on magnetic information of the image.

27. A computer readable storage medium for storing a program to execute an image processing method, said program comprising:

code for deciding layout information for an output image based on at least one frame being positioned at a user-desired position on an output image preview window according to a user designation, wherein each frame indicates information of the position to lay out the image;

code for registering an editing set to an editing menu, wherein the editing set includes the decided layout information and a plurality of editing processes designated by a user;

code for identifying an editing set selected from the editing menu;

code for inputting a plurality of images by image inputting means;

code for displaying the plurality of images input by the image inputting means in the form of reduced-size images;

code for selecting at least one image from the plurality of displayed images; and code for outputting the output image by performing the plurality of editing processes, included in the editing step identified by said identifying code, on the at least one image selected in said selecting step and by arranging the selected image at the user-desired position based on the layout information, included in the editing step identified by said identifying code, wherein the editing processes and the layout information thereby correspond to the editing set identified by said identifying code, and wherein each frame indicates information of the user-desired position to arrange each selected image on the output image.

28. A storage medium according to claim 27, wherein said program further includes code for executing a step of displaying the editing menu that includes a plurality of identifiers each indicating one of the editing sets registered by said registering code, wherein said identifying code includes code identifying the selected editing set by identifying an identifier selected from the editing menu.

29. A storage medium according to claim 27, wherein the editing set registered by said registering code is the plurality of editing processes designated by the user on the output image preview window.

30. A storage medium according to claim 27, wherein the editing set includes an image selection condition, and wherein said selecting code includes code selecting at least one image from the plurality of displayed images based on the image selection condition of the editing set identified by said identifying code.

31. A storage medium according to claim 30, wherein the image selection condition is a condition based on the order of the plurality of images displayed by said display code.

* * * * *